(12) United States Patent
Ning

(10) Patent No.: US 11,645,151 B1
(45) Date of Patent: May 9, 2023

(54) BASE DIE, MEMORY SYSTEM, AND SEMICONDUCTOR STRUCTURE

(71) Applicant: CHANGXIN MEMORY TECHNOLOGIES, INC., Hefei (CN)

(72) Inventor: Shu-Liang Ning, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/661,604

(22) Filed: May 2, 2022

(30) Foreign Application Priority Data

Oct. 29, 2021 (CN) .......................... 202111272430.5

(51) Int. Cl.
  *G11C 29/00* (2006.01)
  *G06F 11/10* (2006.01)
  *G06F 13/16* (2006.01)
  *G06F 11/07* (2006.01)

(52) U.S. Cl.
  CPC ...... *G06F 11/1068* (2013.01); *G06F 11/0772* (2013.01); *G06F 11/0787* (2013.01); *G06F 13/1689* (2013.01)

(58) Field of Classification Search
  CPC ............ G06F 11/1068; G06F 11/0787; G06F 11/0772; G06F 13/1689
  See application file for complete search history.

(56) References Cited

U.S. PATENT DOCUMENTS

| 11,416,335 B2 | 8/2022 | Cho et al. | |
| 2009/0012229 A1* | 1/2009 | Desbois | C08L 77/06 524/538 |
| 2019/0250985 A1* | 8/2019 | Seo | G06F 11/1068 |

* cited by examiner

*Primary Examiner* — Samir W Rizk
(74) *Attorney, Agent, or Firm* — Syncoda LLC; Feng Ma

(57) ABSTRACT

A base die is configured to: receive a first data and a first encoded data in a writing phase and perform a first error checking and correction processing, where the first encoded data is obtained by performing a first error correction code (ECC) encoding processing on the first data; perform a second ECC encoding processing on the first data on which the first error checking and correction processing has been performed, to generate a second encoded data; and choose to transmit a to-be-written data to a memory die based on a selection signal in the writing phase, where the to-be-written data is either an initial data or a second data; and choose to transmit the initial data or third data in a reading phase based on a selection signal.

19 Claims, 6 Drawing Sheets

BASE DIE, MEMORY SYSTEM, AND SEMICONDUCTOR STRUCTURE

CROSS-REFERENCE TO RELATED APPLICATION

This application claims priority to Chinese Patent Application No. 202111272430.5 filed on Oct. 29, 2021, the disclosure of which is hereby incorporated by reference in its entirety.

BACKGROUND

Semiconductor memory can be divided into non-volatile memory and volatile memory. A dynamic random access memory (DRAM), as a volatile memory, has the advantages of high storage density and high read/write speed, and is widely used in various electronic systems.

As the DRAM has an increasingly advanced process and higher storage density, data stored in the DRAM may have errors, which may seriously affect the performance of the DRAM. Therefore, the error checking and correction or error correction coding technology is usually used in the DRAM to detect or correct errors of the stored data.

SUMMARY

Embodiments of the present application relate to the technical field of semiconductors, and in particular, to a base die, a memory system, and a semiconductor structure.

According to some embodiments of the present application, in an aspect of the embodiments of the present application, a base die applied to a memory system is provided, where the base die is configured to: the base die is configured to: receive a first data and a first encoded data in a writing phase and perform a first error checking and correction processing, where the first encoded data is obtained by performing a first error correction code (ECC) encoding processing on the first data; perform a second ECC encoding processing on the first data on which the first error checking and correction processing has been performed, to generate a second encoded data; and choose to transmit a to-be-written data to a memory die based on a selection signal in the writing phase, where the to-be-written data is either an initial data or a second data, the second data includes the first data on which the first error checking and correction processing has been performed and the second encoded data, and the initial data includes the first data and the first encoded data; and the base die is further configured to: if the to-be-written data is the second data, receive the second data from the memory die in a reading phase, perform a second error checking and correction processing, perform a third ECC encoding processing on the first data on which the second error checking and correction processing has been performed to generate a third encoded data, and choose to transmit a read data in the reading phase based on the selection signal, where the read data is either a third data or the initial data from the memory die, and the third data includes the first data on which the second error checking and correction processing has been performed and the third encoded data.

According to some embodiments of the present application, in another aspect of the embodiments of the present application, a memory system is provided, including a base die, a processor, and a memory die. The processor is configured to: perform a first ECC encoding processing on a first data in a writing phase to generate a first encoded data, and transmit the first data and the first encoded data to the base die; the base die is configured to: receive the first data and the first encoded data in the writing phase, perform a first error checking and correction processing, perform a second ECC encoding processing on the first data on which the first error checking and correction processing has been performed to generate a second encoded data, and choose to transmit a to-be-written data to the memory die in the writing phase based on a selection signal, where the to-be-written data is either an initial data or a second data, the second data includes the first data on which the first error checking and correction processing has been performed and the second encoded data, and the initial data includes the first data and the first encoded data; the base die is further configured to: if the to-be-written data is the second data, receive the second data from the memory die in a reading phase, perform a second error checking and correction processing, perform a third ECC encoding processing on the first data on which the second error checking and correction processing has been performed to generate a third encoded data, and choose to transmit a read data to the processor in the reading phase based on the selection signal, where the read data is either a third data or the initial data from the memory die, and the third data includes the first data on which the second error checking and correction processing has been performed and the third encoded data; the memory die is configured to receive the to-be-written data in the writing phase, store the to-be-written data, and transmit the read data to the base die in the reading phase; and the processor is further configured to receive the read data in the reading phase, perform a third error checking and correction processing on the read data, and obtain the first data on which the third error checking and correction processing has been performed.

According to some embodiments of the present application, in further another aspect of the embodiments of the present application, a semiconductor structure is further provided, including: a carrier substrate; and the memory system described above, where the processor and the base die are both located on a surface of the carrier substrate, and the memory die is located on a surface of the base die that is away from the carrier substrate.

BRIEF DESCRIPTION OF THE DRAWINGS

One or more embodiments are exemplified by corresponding drawings, and these exemplified descriptions do not constitute a limitation on the embodiments. Components with the same reference numerals in the drawings are denoted as similar components, and the drawings are not limited by scale unless otherwise specified.

DETAILED DESCRIPTION

Figure 1:
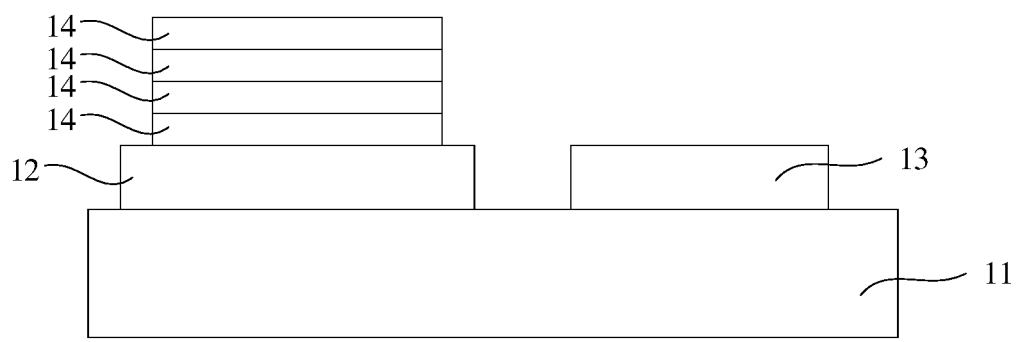
FIG. 1 is a schematic structural diagram of a semiconductor structure.
Figure 2:
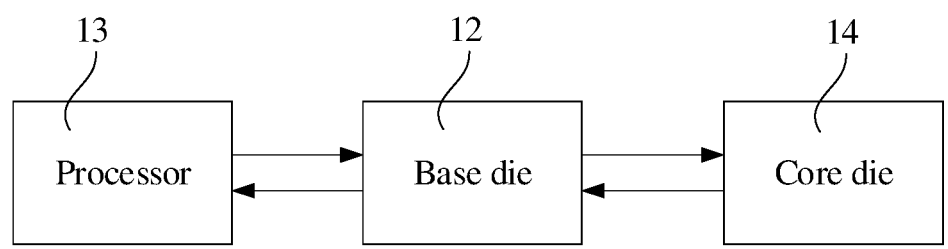
FIG. 2 is a schematic diagram of data transmission in the semiconductor structure provided in FIG. 1.

FIG. 1 is a schematic structural diagram of a semiconductor structure; FIG. 2 is a schematic diagram of data transmission in the semiconductor structure provided in FIG. 1.

Referring to FIG. 1, a semiconductor structure may include: a substrate 11; a base die 12 and a processor 13 that are located on a surface of the substrate 11; and a plurality of core dies 14 stacked on the base die 12, where the core dies 14 may be DRAM dies. Referring to FIG. 2, a data transmission process in the semiconductor structure includes: in a writing phase, the processor 13 transmits data to the base die 12, and the base die 12 transmits the data to the core die 14; before transmitting the data, the processor 13 may first perform error correction code (ECC) encoding processing on the data. In a reading phase, the core die 14 transmits data to the base die 12, and then the base die 12 transmits the data to the processor 13; the processor 13 receives the data and performs ECC decoding processing on the data, to detect and correct errors of the data.

Obviously, in the semiconductor structure, the base die 12 does not participate in the error checking and correction processing. That is, the base die 12 does not have an ECC encoding function and the corresponding error checking and correction function, and the error checking needs to be completed by the processor 13 or the core die 14. This makes the originally tight die areas of the processor 13 and the core die 14 even tighter, which affects the performance of the processor 13 and the core die 14. Therefore, the storage performance of the entire semiconductor structure still needs to be improved.

Figure 3:
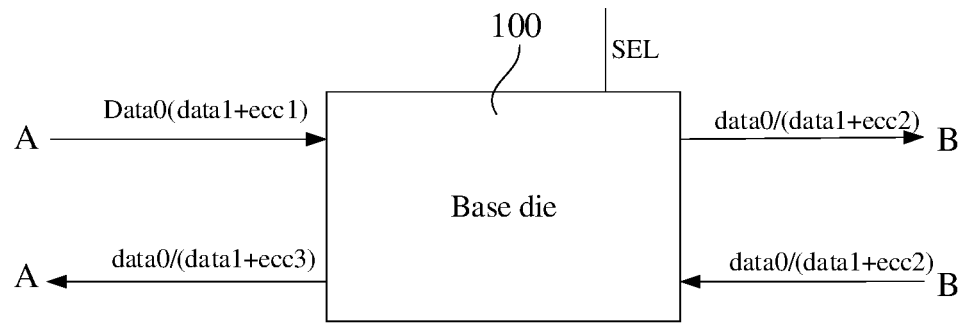
FIG. 3 is a first schematic structural diagram of a base die according to an embodiment of the present application.
Figure 4:
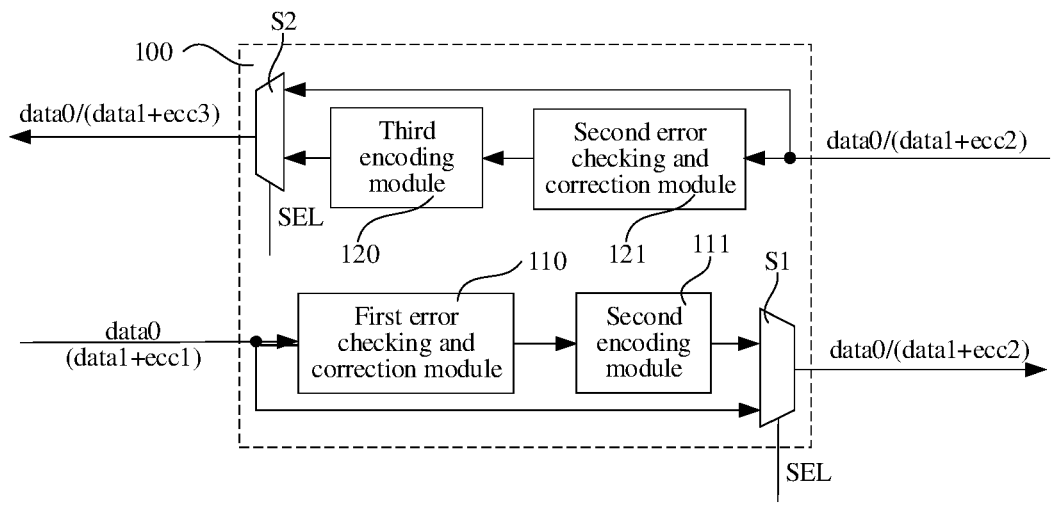
FIG. 4 is a second schematic structural diagram of a base die according to an embodiment of the present application.
Figure 5:
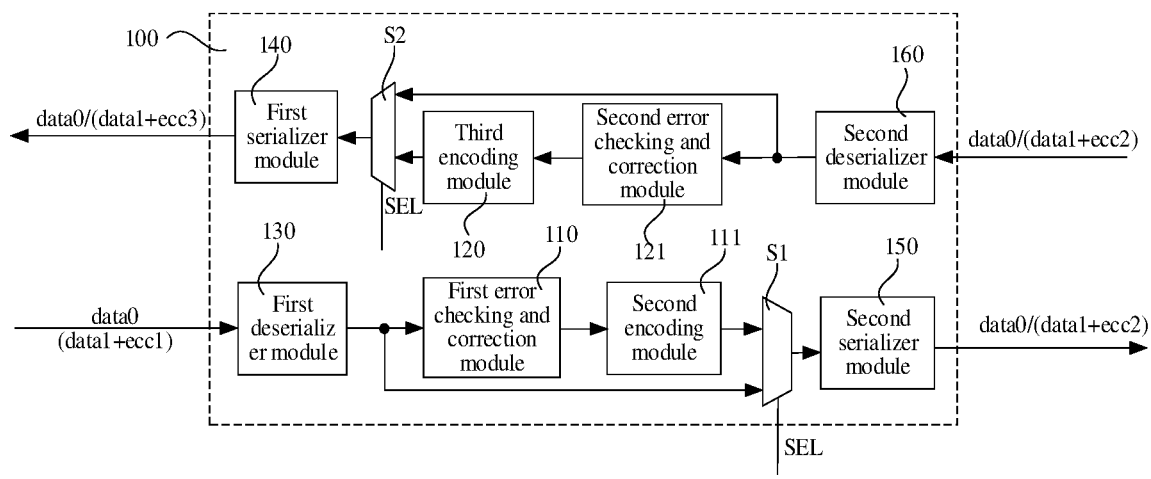
FIG. 5 is a third schematic structural diagram of a base die according to an embodiment of the present application.
Figure 6:
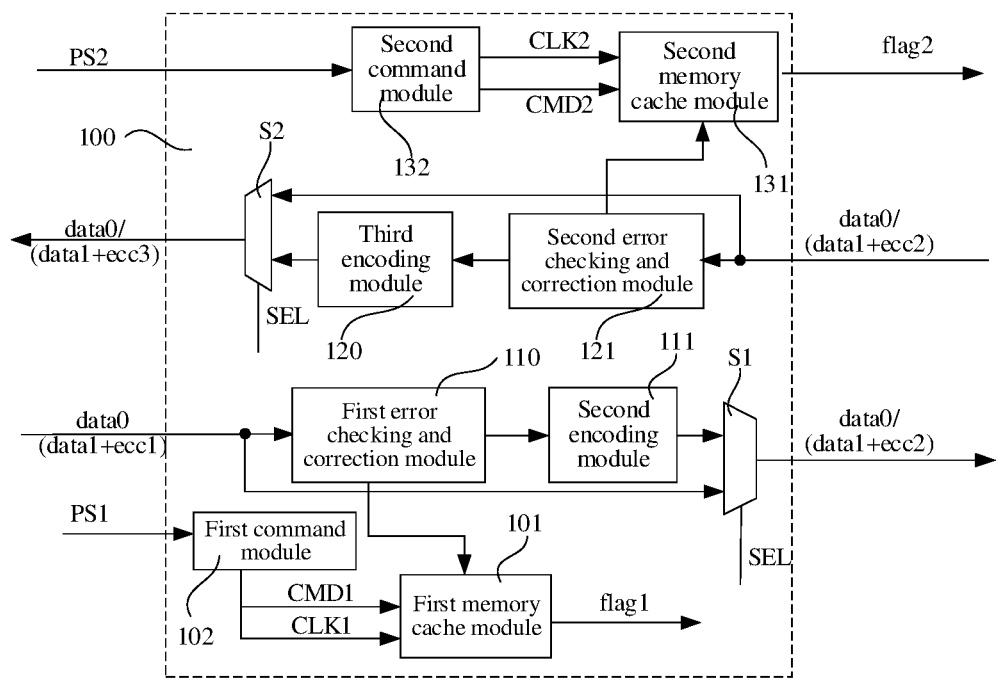
FIG. 6 is a fourth schematic structural diagram of a base die according to an embodiment of the present application.

Embodiments of the present application provide a base die, a memory system, and a semiconductor structure. The base die has an error checking and correction function. FIG. 3 is a first schematic structural diagram of a base die according to some embodiments of the present application; FIG. 4 is a second schematic structural diagram of a base die according to some embodiments of the present application; FIG. 5 is a third schematic structural diagram of a base die according to an embodiment of the present application; and FIG. 6 is a schematic structural diagram based on FIG. 4.

In order to make the objectives, technical solutions and advantages of the embodiments of the present application clearer, the embodiments of the present application are described below with reference to the accompanying drawings. Those of ordinary skill in the art should understand that many technical details are proposed in each embodiment of the present application to help the reader better understand the present application. However, even without these technical details and various changes and modifications made based on the following embodiments, the technical solutions claimed in the present application may still be realized.

Referring to FIG. 3, a base die 100 is applied to a memory system. The base die 100 is configured to: receive a first data data1 and a first encoded data ecc1 in a writing phase and perform a first error checking and correction processing, where the first encoded data ecc1 is obtained by performing a first ECC encoding processing on the first data data1; perform a second ECC encoding processing on the first data data1 on which the first error checking and correction processing has been performed, to generate a second encoded data ecc2; choose to transmit a to-be-written data to a memory die based on a selection signal SEL in the writing phase, where the to-be-written data is either an initial data data0 or a second data, the second data includes the first data data1 on which the first error checking and correction processing has been performed and the second encoded data ecc2, and the initial data data0 includes the first data data1 and the first encoded data ecc1. The base die 100 is further configured to: if the to-be-written data is the second data, receive the second data from the memory die in a reading phase, perform a second error checking and correction processing, perform a third ECC encoding processing on the first data data1 on which the second error checking and correction processing has been performed to generate a third encoded data ecc3, and choose to transmit a read data based on the selection signal SEL in the reading phase, where the read data is either a third data or the initial data data0 from the memory die, and the third data includes the first data data1 on which the second error checking and correction processing has been performed and the third encoded data ecc3.

In the embodiments of the present application, during data transmission, the base die 100 chooses, based on a selection signal SEL, whether to participate in ECC encoding processing and error checking and correction processing. In one aspect, the base die 100 can share the error checking and correction function required by a processor, which helps reduce the die area required by the processor and lower the die design difficulty of the processor. In another aspect, the base die 100 can choose, based on the selection signal SEL, whether to perform data error checking and correction, which can meet different requirements on the data error checking and correction capability and meet requirements of different data transmission rates. Specifically, if the base die 100 does not participate in the data error checking and correction processing, a high data transmission rate is achieved; if the base die 100 participates in the data error checking and correction processing, a strong data error checking and correction capability is achieved, so that the accuracy of the data error checking and correction can be improved.

In some embodiments, the base die 100 may be connected between a first port A and a second port B, where the first port A is connected to a data transmission port of a processor of the memory system, and the second port B is connected to a data transmission port of a memory die of the memory system. It may be understood that, the first port A and the second port B are general terms. The first port A includes a plurality of data transmission ports, and the second port B includes a plurality of data transmission ports. The number of data transmission ports is correlated to the number of pieces of data to be transmitted by the base die 100. For example, the number of data transmission ports is the same as the number of pieces of data to be transmitted by the base die 100, and one piece of data may be transmitted through one data transmission port.

The ECC encoding processing and the error checking and correction processing are both used for implementing ECC error checking and correction, to discover and locate errors of the first data during transmission and correct the errors. In some embodiments, the ECC error checking and correction may adopt an error correction mechanism of Reed Solomon Code (RS); accordingly, the ECC encoding processing may adopt an RS encoding algorithm to generate encoded data, and decoding processing in the error checking and correction processing may adopt an RS decoding algorithm. In other embodiments, the ECC error checking and correction may adopt an error correction mechanism of Hamming code; accordingly, the ECC encoding processing may adopt a Hamming code encoding algorithm to generate encoded data, and decoding processing in the error checking and correction processing may adopt a Hamming code decoding algorithm.

In some embodiments, the first data data1 may be 256-bit data, and correspondingly, the first encoded data ecc1 may be 16-bit data. It may be understood that, in other embodiments, the first encoded data may include different numbers of bits depending on specific algorithms adopted in the first ECC encoding processing. In addition, the first data data1 may include other numbers of bits, for example, 128 or 512.

FIG. 4 is a second schematic structural diagram of a base die according to an embodiment of the present application. Referring to FIG. 4, in some embodiments, the base die 100 may include: a first error checking and correction module 110, configured to: receive the first data data1 and the first encoded data ecc1 in the writing phase and perform the first error checking and correction processing; a second encoding module 111, configured to receive, in the writing phase, the first data data1 on which the first error checking and correction processing has been performed, and perform the second ECC encoding processing to generate the second encoded data ecc2; a second error checking and correction module 121, configured to receive the second data in the reading phase and perform the second error checking and correction processing; a third encoding module 120, configured to receive, in the reading phase, the first data data1 on which the second error checking and correction processing has been performed, and perform the third ECC encoding processing to generate the third encoded data ecc3; a first selection module S1, configured to choose to transmit either the initial data data0 or the second data to the memory die based on the selection signal SEL; and a second selection module S2, configured to output the read data based on the selection signal SEL, where the read data is either the third data or the initial data data0 from the memory die.

It may be understood that, if the to-be-written data is the initial data data0, that is, the to-be-written data is the first data data1 and the first encoded data ecc1 from the processor, the read data is the initial data data0 from the memory die, that is, the read data is the first data data1 and the first encoded data ecc1 from the memory die, where the error checking and correction processing has not been performed on the first data data1. If the to-be-written data is the second data, that is, the to-be-written data is the first data data1 on which the first error checking and correction processing has been performed and the second encoded data ecc2, the read data is the third data, where the third data includes the first data data1 on which the second error checking and correction processing has been performed and the third encoded data ecc3.

Through the first error checking and correction processing, an error of the first data data1 and an error of the first encoded data ecc1 during transmission from the processor to the base die 100 can be detected, and if the data has an error, the error can be corrected. Through the second error checking and correction processing, an error of the second data during transmission between the base die 100 and the memory die can be detected, and if the data has an error, the error can be corrected. It can be understood that, the transmission of the second data between the base die 100 and the memory die includes: transmitting the second data from the base die 100 to the memory die in the writing phase, and transmitting the second data from the memory die to the base die 100 in the reading phase. In this way, errors of data transmitted on at least two transmission paths can be detected and corrected, which helps locate the specific path where the data transmission error occurs, and the at least two rounds of error checking and correction processing help improve the accuracy of data correction.

The first selection module S1 and the second selection module S2 allow the base die 100 to choose whether to participate in ECC error checking and correction in the whole memory system. When the memory system has different requirements on the storage rate and data accuracy, whether the base die 100 participates in ECC error checking and correction is determined through the first selection module S1 and the second selection module S2.

In some embodiments, the third encoding module 120 performs the third ECC encoding processing on the first data data1 on which the second error checking and correction processing has been performed, so as to transmit the first data data1 on which the second error checking and correction processing has been performed and the third encoded data ecc3 to the processor, so that the processor can perform error checking and correction processing again in the reading phase, which helps improve the accuracy of data error correction.

In some embodiments, it should be understood that, the first ECC encoding processing and the second ECC encoding processing may be implemented by different encoding algorithms. For example, the first encoded data ecc1 may be 16-bit data, and the second encoded data ecc2 may be 32-bit data. Accordingly, the first error checking and correction processing and the second error checking and correction processing may be implemented by different decoding algorithms That is, the first ECC encoding processing and the first error checking and correction processing are implemented by a first compiling algorithm, and the second ECC encoding processing and the second error checking and correction processing are implemented by a second compiling algorithm, where the first compiling algorithm may be different from the second compiling algorithm. The ECC error checking implemented by different compiling algorithms helps further improve the accuracy of data correction and makes it less difficult for the base die 100 to recognize different encoded data. In other embodiments, the first compiling algorithm may be the same as the second compiling algorithm.

The second encoding module 111 is connected between the first error checking and correction module 110 and the memory die, and the second error checking and correction module 121 is connected between the memory die and the third encoding module 120. The second error checking and correction module 121 receives the first data data1 on which the first error checking and correction processing has been performed and the second encoded data ecc2, and performs the second error checking and correction processing on the first data data1 on which the first error checking and correction processing has been performed and the second encoded data ecc2.

It should be noted that, the terms "first", "second" and "third" in the embodiments of the present application are merely for descriptive distinction but are not intended to particularly limit the sequence of the corresponding features.

The working principle of the base die 100 is described in detail below with reference to FIG. 4.

In the first case, under the control of the selection signal SEL, the first selection module S1 and the second selection module S2 determine that the base die 100 does not participate in the ECC error checking and correction:

In the writing phase, the initial data from the processor is stored into the memory die through the first selection module S1; the initial data includes the first data data1 and the first encoded data ecc1 from the processor. In the reading phase, the read data from the memory die is transmitted to the processor through the second selection module S2; the read data is the first data data1 and the first encoded data ecc1 from the memory die, and the first data data1 is the first data data1 on which the error checking and correction processing has not been performed.

In the storage process above, the base die 100 does not participate in the ECC error checking and correction, and the processor performs the error checking and correction, which helps improve the data transmission rate.

In the second case, under the control of the selection signal SEL, the first selection module S1 and the second selection module S2 determine that the base die 100 participates in the ECC error checking and correction:

In the writing phase, the first data data1 and the first encoded data ecc1 from the processor are transmitted to the first error checking and correction module; after performing the first error checking and correction processing, the first error checking and correction module 110 transmits the first data data1 on which the first error checking and correction processing has been performed to the second encoding module 111 for the second ECC encoding processing, to generate the second encoded data ecc2, and then the first data data1 on which the first error checking and correction processing has been performed and the second encoded data ecc2 are stored into the memory die through the first selection module S1.

In the reading phase, the second encoded data ecc2 from the memory die and the first data data1 on which the first error checking and correction processing has been performed are transmitted to the second error checking and correction module 121 for the second error checking and correction processing. The first data data1 on which the second error checking and correction processing has been performed is transmitted to the third encoding module 120 for the third ECC encoding processing, to generate the third encoded data ecc3. The first data data1 on which the second error checking and correction processing has been performed and the third encoded data ecc3 are transmitted to the processor through the second selection module S2; the first data data1 on which the second error checking and correction processing has been performed and the third encoded data ecc3 are the read data.

In the storage process above, both the processor and the base die 100 participate in the ECC error checking and correction, which helps improve the accuracy of the data error checking and correction.

FIG. 5 is a third schematic structural diagram of a base die according to an embodiment of the present application. Referring to FIG. 5, in some embodiments, the base die 100 may further include: a first deserializer (DES) module 130, configured to receive the first data data1 and the first encoded data ecc1 in the writing phase, perform a first deserialization processing on the first data data1 and the first encoded data ecc1, and transmit the first data data1 and the first encoded data ecc1 on which the first deserialization processing has been performed to the first error checking and correction module 110 and the first selection module S1; and a first serializer (SER) module 140, configured to receive the read data from the second selection module S2 in the reading phase, perform a first serialization processing on the read data, and transmit the read data on which the first serialization processing has been performed to the processor.

The first deserializer module 130 and the first serializer module 140 can reduce the number of transmission channels between the base die 100 and the processor, and increase the number of bits transmitted on each transmission channel. In addition, as the number of transmission channels decreases, the number of data transmission ports required by the base die 100 and the processor can be reduced, to save the die area of the base die 100 and the die area of the processor. The first data data1 is transmitted to the first deserializer module 130 in a serial manner. The first deserializer module 130 is also known as a deserializer, which deserializes the first data data1 and the first encoded data ecc1. The first serializer module 140 performs serialization processing on the read data and transmits the read data on which the serialization processing has been performed. The first serializer module 140 is also known as a serializer.

For example, the first data data1 includes 256 bits, and the first data data1 is transmitted to the first deserializer module 130 through 32 transmission channels. The first encoded data ecc1 includes 16 bits, and the first encoded data ecc1 is transmitted to the first deserializer module 130 through 2 transmission channels. After the first data data1 and the first encoded data ecc1 are deserialized by the first deserializer module 130, the first data data1 is transmitted to the first error checking and correction module 110 by using 256 transmission channels, and the first encoded data ecc1 is transmitted to the first error checking and correction module 110 through 16 transmission channels.

If the base die 100 does not participate in the ECC error checking and correction, the read data includes 256+16 bits, where 256 bits of the data are the first data data1 on which the error checking and correction processing has not been performed, and 16 bits of the data are the first encoded data ecc1. After the serialization processing by the first serializer module 140, the read data is converted into 32+2 streams of data. Correspondingly, the 32+2 streams of data may be transmitted through 32+2 transmission channels, where 32 streams of the data are the first data data1, and 2 streams of the data are the first encoded data ecc1.

If the base die 100 participates in the ECC error checking and correction, the read data includes 256+16 bits, where 256 bits of the data are the first data data1 on which the second error checking and correction processing has been performed, and 16 bits of the data are the third encoded data ecc3. After the serialization processing by the first serializer module 140, the read data is converted into 32+2 streams of data. Correspondingly, the 32+2 streams of data may be transmitted through 32+2 transmission channels, where 32 streams of the data are the first data data1 on which the second error checking and correction processing has been performed, and 2 streams of the data are the third encoded data ecc3.

Referring to FIG. 5, in some embodiments, in addition to the first deserializer module 130 and the first serializer module 140, the base die 100 may further include: a second serializer module 150, configured to receive the to-be-written data from the first selection module S1 in the writing phase, perform a second serialization processing, and transmit the to-be-written data on which the second serialization processing has been performed to the memory die; and a second deserializer module 160, configured to receive the second data or the initial data from the memory die in the reading phase, perform a second deserialization processing.

The second serializer module 150 performs serialization processing on the to-be-written data, which helps reduce the number of transmission channels between the base die 100 and the memory die, to reduce the number of data transmission ports required by the base die 100 and the memory die, thereby saving the die area of the base die 100 and the die area of the memory die. For example, if the base die 100 participates in the ECC error checking and correction, the to-be-written data may include 256-bit first data data1 on which the first error checking and correction processing has been performed and 32-bit second encoded data ecc2. After the serialization processing by the second serializer module 150, the to-be-written data can be transmitted to the memory die by using 128+16 transmission channels, where 128 transmission channels transmit the first data data1 on which the first error checking and correction processing has been performed, and 16 transmission channels transmit the second encoded data ecc2.

If the base die 100 participates in the ECC error checking and correction, the second deserializer module 160 performs parallel processing on the second data transmitted from the memory die, that is, performs deserialization processing on the second data, and the second data after the deserialization processing is transmitted to the second error checking and correction module 121. If the base die 100 does not participate in the ECC error checking and correction, the second deserializer module 160 performs parallel processing on the initial data from the memory die, to transmit the initial data to the processor.

In some embodiments, the base die 100 may be further configured to generate a first error checking marker signal during the error checking and correction processing, and record, based on the first error checking marker signal, an error of the first data data1 and an error of the first encoded data ecc1 during transmission. Specifically, if the first data data1 or the first encoded data ecc1 has an error during transmission, the first error checking marker signal is generated; if the first data data1 and the first encoded data ecc1 has no error during transmission, no first error checking marker signal is generated. In addition, in some embodiments, the first error checking marker signal may be defined as follows: if the first data data1 or the first encoded data ecc1 has an error during transmission, the first error checking marker signal is 1; if the first data data1 and the first encoded data ecc1 have no error during transmission, the first error checking marker signal is 0. In other embodiments, the first error checking marker signal may also be defined as follows: if the first data data1 or the first encoded data ecc1 has an error during transmission, the first error checking marker signal is 0; if the first data data1 and the first encoded data ecc1 have no error during transmission, the first error checking marker signal is 1.

Through the first error checking marker signal, it can be learned whether the first data data1 or the first encoded data ecc1 has an error during transmission on a data transmission path from the processor to the base die 100 in the writing phase.

As shown in FIG. 6, FIG. 6 is a schematic structural diagram based on FIG. 4. In some embodiments, the base die 100 may further include: a first memory cache module 101, configured to store the error of the first data data1 and the error of the first encoded data ecc1 during transmission; and a first command module 102, configured to receive a first polling instruction PS1, and generate a first command signal CMD1 and a first clock signal CLK1. The first memory cache module is further configured to output a first representation signal flag1 based on the first command signal CMD1 and the first clock signal CLK1, where the first representation signal flag1 represents the error of the first data data1 or the error of the first encoded data ecc1 during transmission.

It may be understood that, the error of the first data data1 and the error of the first encoded data ecc1 during transmission refer to the error of the first data data1 and the error of the first encoded data ecc1 during transmission from the processor to the base die 100.

In addition, if no first polling instruction PS1 is received, the first memory cache module 101 only stores the error of the first data data1 and the error of the first encoded data ecc1 during transmission; after receiving the first polling instruction PS1, the first command module 102 controls the first memory cache module 101 to output the first representation signal flag1 that represents the error of the first data data1 or the error of the first encoded data ecc1 during transmission. The error of the first data data1 and the error of the first encoded data ecc1 can be obtained based on the first representation signal flag1.

In some embodiments, the first representation signal flag1 may be a binary string. For example, if an error of the first data data1 or the first encoded data ecc1 during transmission is detected, 1 is recorded; if no error of the first data data1 or the first encoded data ecc1 during transmission is detected, 0 is recorded. In this way, after a period of time, first representation signal flag1 is a binary string of 0s and 1s. In other embodiments, the first representation signal flag1 may alternatively be a decimal value. For example, the first memory cache module 101 is a counter, and if an error of the first data data1 during transmission is detected, the count is incremented by 1. In this way, after a period of time, the first representation signal flag1 is a decimal value related to the number of errors.

In some embodiments, the first memory cache module 101 may be a first input first output (FIFO) register. By using the FIFO register as the first memory cache module 101, a continuous data stream can be cached, to avoid data missing during a storage operation. In addition, the error of the first data data1 during transmission can be pushed and stored collectively, which can avoid frequent bus operations and help improve the data transmission speed.

In some embodiments, the first clock signal CLK1 may be generated by the first command module 102 independently; in other embodiments, the first clock signal CLK1 may alternatively be provided from the external, for example, provided by a processor that generates the first polling instruction PS1.

In some embodiments, referring to FIG. 6, the base die 100 may be further configured to: generate a second error checking marker signal during the second error checking and correction processing, and record, based on the second error checking marker signal, an error of the first data data1 on which the first error checking and correction processing has been performed and an error of the second encoded data during transmission. Through the second error checking marker signal, it can be learned whether the second encoded data ecc2 and the first data data1 have an error during transmission on a data transmission path from the memory die to the base die 100 in the reading phase.

For the detailed description of the second error checking marker signal, reference may be made to the corresponding description of the first error checking marker signal above, and details are not described herein again.

Referring to FIG. 6, in some embodiments, the base die 100 may also include: a second memory cache module 131, configured to store the error of the first data data1 on which the first error checking and correction processing has been performed and the error of the second encoded data ecc2 during transmission; and a second command module 132, configured to receive a second polling instruction PS2, and generate a second command signal CMD2 and a second clock signal CLK2. The second memory cache module 131 is further configured to output a second representation signal flag2 based on the second command signal CMD2 and the second clock signal CLK2, where the second representation signal flag2 represents the error of the first data data1 on which the first error checking and correction processing has been performed and the error of the second encoded data ecc2 during transmission.

For the detailed description of the second memory cache module 131, reference may be made to the description about the first memory cache module 101; for the detailed description of the second command module 132, reference may be made to the description about the first command module 102. Details are not described herein again.

The base die 100 provided in the foregoing embodiment not only has a data transmission function, but also has an ECC encoding processing function and an error checking and correction processing function. In this way, the die area of the base die 100 can be effectively used, to reduce the pressure on the die areas of the processor and the memory die and save the die areas of the processor and the memory die.

In addition, the base die 100 may further have data serialization processing and serialization processing functions, which helps reduce the number of transmission channels between the processor and the base die 100 and reduce the number of transmission channels between the memory die and the base die 100, thereby reducing the number of data transmission ports required by the processor, the base die 100, and the memory die, and saving die areas of the processor, the base die 100, and the memory die.

In addition, both the first error checking and correction module 110 and the second error checking and correction module 121 can detect and correct errors of data, which helps improve the capability of checking and correcting data errors and locate a transmission path where a data error occurs.

Another embodiment of the present application further provides a memory system, where the memory system includes a processor, a memory die, and the base die provided in the foregoing embodiment. The memory system provided by another embodiment of the present application is described in detail below with reference to the drawings. It should be noted that, for the parts the same as or corresponding to those mentioned in the foregoing embodiment, reference may be made to the foregoing embodiment, and details will not be described herein again.

Figure 7:
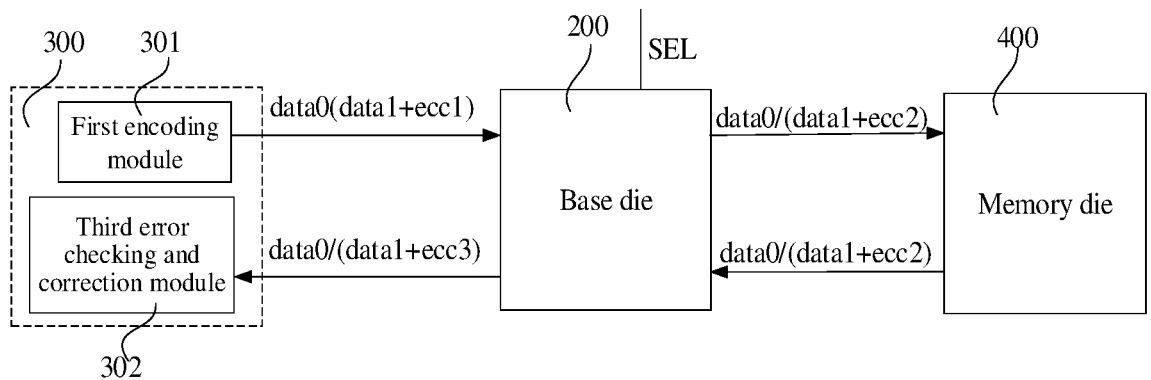
FIG. 7 is a first schematic structural diagram of a memory system according to an embodiment of the present application.

FIG. 7 is a first schematic structural diagram of a memory system according to an embodiment of the present application.

Referring to FIG. 7, the memory system includes: a base die 200, a processor 300, and a memory die 400. The processor is configured to: perform a first ECC encoding processing on a first data data1 in a writing phase to generate a first encoded data ecc1, and transmit the first data data1 and the first encoded data ecc1 to the base die. The base die 200 is configured to: receive the first data data1 and the first encoded data ecc1 in the writing phase, perform a first error checking and correction processing, perform a second ECC encoding processing on the first data data1 on which the first error checking and correction processing has been performed to generate a second encoded data ecc2, and choose to transmit a to-be-written data to the memory die 400 in the writing phase based on a selection signal, where the to-be-written data is either an initial data or a second data, the second data includes the first data data1 on which the first error checking and correction processing has been performed and the second encoded data ecc2, and the initial data includes the first data data1 and the first encoded data ecc1. The base die 200 is further configured to: if the to-be-written data is the second data, receive the second data from the memory die 400 in the reading phase, perform a second error checking and correction processing, and perform a third ECC encoding processing on the first data data1 on which the second error checking and correction processing has been performed to generate a third encoded data ecc3, and choose to transmit a read data to the processor 300 in the reading phase based on the selection signal SEL, where the read data is either a third data or the initial data from the memory die 400, and the third data includes the first data data1 on which the second error checking and correction processing has been performed and the third encoded data ecc3. The memory die 400 is configured to: receive and store the to-be-written data in the writing phase, store the to-be-written data, and transmit the read data to the base die 200 in the reading phase. The processor 300 is further configured to receive the read data in the reading phase, perform a third error checking and correction processing on the read data, and obtain the first data data1 on which the third error checking and correction processing has been performed.

In the foregoing memory system, both the ECC encoding processing and the error checking and correction processing on the data can be implemented by the base die 200. Therefore, the memory die 400 does not need to perform the encoding processing and the error checking and correction processing, and the base die 200 can participate in the encoding processing and error checking and correction processing required by the processor 300, so that functions required by the processor 300 and the memory die 400 are reduced, which can make the die areas of the processor 300 and the memory die 400 less tight, thereby better improving the performance of the processor 300 and the memory die 400. For example, the reliability of the memory die 400 can be improved, thus enhancing the storage performance of the memory system. In addition, the selection signal SEL allows the base die 200 to choose whether to participate in the encoding processing and the error checking and correction processing, so that the selectivity of the read/write operation of the memory system is improved.

In some embodiments, the memory system may be a DRAM memory system, for example, a double data rate (DDR) 4 DRAM memory system, or a DDR5 DRAM memory system. In other embodiments, the memory system may alternatively be a static random-access memory (SRAM) memory system, a NAND memory system, a NOR memory system, a FeRAM memory system, or a PcRAM memory system.

The processor 300 may include: a first encoding module 301, configured to perform the first ECC encoding processing on the first data data1 in the writing phase, to generate the first encoded data ecc1; and a third error checking and correction module 302, configured to receive the read data in the reading phase and perform the third error checking and correction processing.

The base die 200 can provide a high-speed interface for data transmission in the memory system. In addition, the base die 200 is further configured to manage and control the memory die 400. In some embodiments, the base die 200 may be configured to perform temperature monitoring and temperature management on the memory die 400, and may further be configured to perform a Memory Build-In-Self Test (MBIST) on the memory die 400 and self-repair. In addition, the base die 200 is further configured to perform error checking and correction on transmitted data.

Figure 8:
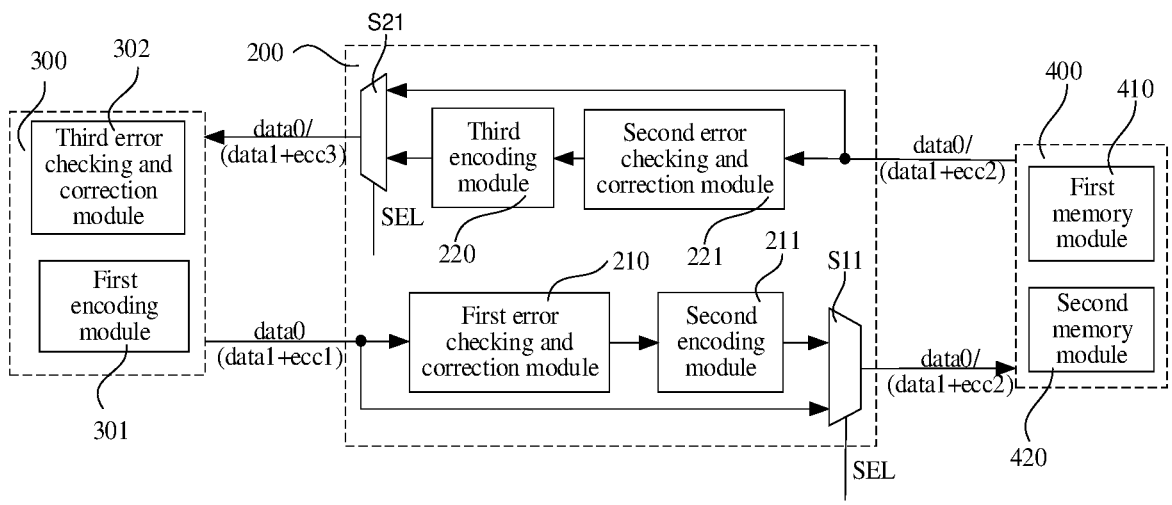
FIG. 8 is a second schematic structural diagram of a memory system according to an embodiment of the present application.

FIG. 8 is a second schematic structural diagram of a memory system according to an embodiment of the present application. Referring to FIG. 8, in some embodiments, the base die 200 may include: a first error checking and correction module 210, configured to: receive the first data data1 and the first encoded data ecc1 in the writing phase and perform the first error checking and correction processing; a second encoding module 211, configured to receive, in the writing phase, the first data data1 on which the first error checking and correction processing has been performed, and perform the second ECC encoding processing to generate the second encoded data ecc2; a second error checking and correction module 221, configured to receive the second data in the reading phase and perform the second error checking and correction processing; a third encoding module 220, configured to receive, in the reading phase, the first data data1 on which the second error checking and correction processing has been performed, and perform the third ECC encoding processing to generate the third encoded data ecc3; a first selection module S11, configured to choose to transmit either the initial data or the second data to the memory die 400 based on the selection signal SEL; and a second selection module S21, configured to output the read data based on the selection signal SEL, where the read data is either the third data or the initial data from the memory die.

For the working principle of the memory system, reference may be made to the corresponding description of foregoing embodiment, and details are not described herein again. It may be understood that, the processor 300 can perform the third error checking and correction processing on the first data data1 on which the second error checking and correction processing has been performed. Moreover, the processor 300 can further perform the third error checking and correction processing on the first data data1 on which the first error checking and correction processing has been performed.

In some embodiments, the first ECC encoding processing, the third ECC encoding processing, the first error checking and correction processing, and the third error checking and correction processing are implemented by a first compiling algorithm; the second ECC encoding processing and the second error checking and correction processing are implemented by a second compiling algorithm, and the first compiling algorithm is different from the second compiling algorithm. The error checking and correction performed on data with different compiling algorithms helps further improve the accuracy of data error checking and correction. Specifically, the second encoding module 211 and the first encoding module 301 may adopt different encoding algorithms; the second encoding module 211 and the third encoding module 220 may adopt different encoding algorithms; the first error checking and correction module 210 and the second error checking and correction module 221 may adopt different decoding algorithms.

Referring to FIG. 8, the memory die 400 includes: a first memory module 410, configured to store either the first data data1 or the first data data1 on which the first error checking and correction processing has been performed; and a second memory module 420, configured to store either the first encoded data ecc1 or the second encoded data ecc2.

Figure 9:
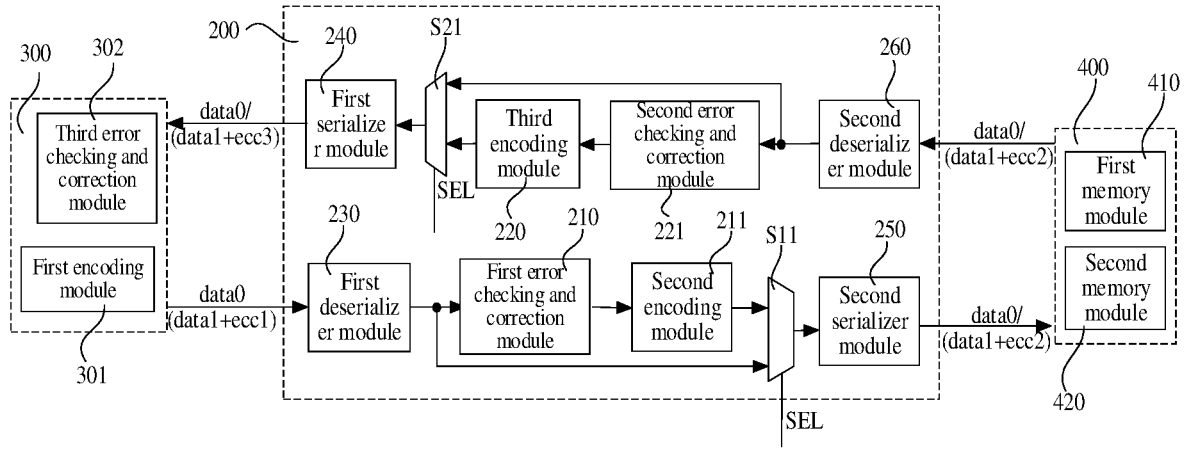
FIG. 9 is a third schematic structural diagram of a memory system according to an embodiment of the present application.

FIG. 9 is a third schematic structural diagram of a memory system according to an embodiment of the present application. Referring to FIG. 9, in some embodiments, the base die 200 may further include: a first deserializer module 230, configured to receive the first data data1 and the first encoded data ecc1 in the writing phase, perform a first deserialization processing on the first data data1 and the first encoded data ecc1, and transmit the first data data1 and the first encoded data ecc1 on which the first deserialization processing has been performed to the first error checking and correction module 210 and the first selection module S11; and a first serializer module 240, configured to receive the read data from the second selection module S21 in the reading phase, perform a first serialization processing on the read data, and transmit the read data on which the first serialization processing has been performed to the processor 300.

Specifically, the first deserializer module 230 is connected between the data transmission port of the processor 300 and a data transmission port of the first selection module S11, and the first serializer module 240 is connected between the data transmission port of the processor 300 and the data transmission port of the second selection module S21. In this way, the number of transmission channels between the processor 300 and the base die 200 can be less than the number of bits of the first data data1, thereby reducing the number of transmission channels between the processor 300 and the base die 200. This can reduce the number of data transmission ports required by the base die 200 and the processor 300 and helps reduce the complexity of the electrical connection structure between the processor 300 and the base die 200, thereby saving the die areas of the processor 300 and the base die 200.

Referring to FIG. 9, the base die 200 may further include: a second serializer module 250, configured to receive the to-be-written data from the first selection module S11 in the writing phase, perform a second serialization processing, and transmit the to-be-written data on which the second serialization processing has been performed memory die 400; and a second deserializer module 260, configured to receive the second data from the memory die 400 or the initial data in the reading phase, and perform a second deserialization processing.

In this way, the number of transmission channels between the memory die 400 and the base die 200 can be less than the number of bits of the first data data1, thereby reducing the number of transmission channels between the memory die 400 and the base die 200. This helps reduce the number of data transmission ports required by the base die 200 and the memory die 400 and helps reduce the complexity of the electrical connection structure between the memory die 400 and the base die 200, thereby saving the die areas of the memory die 400 and the base die 200.

Figure 10:
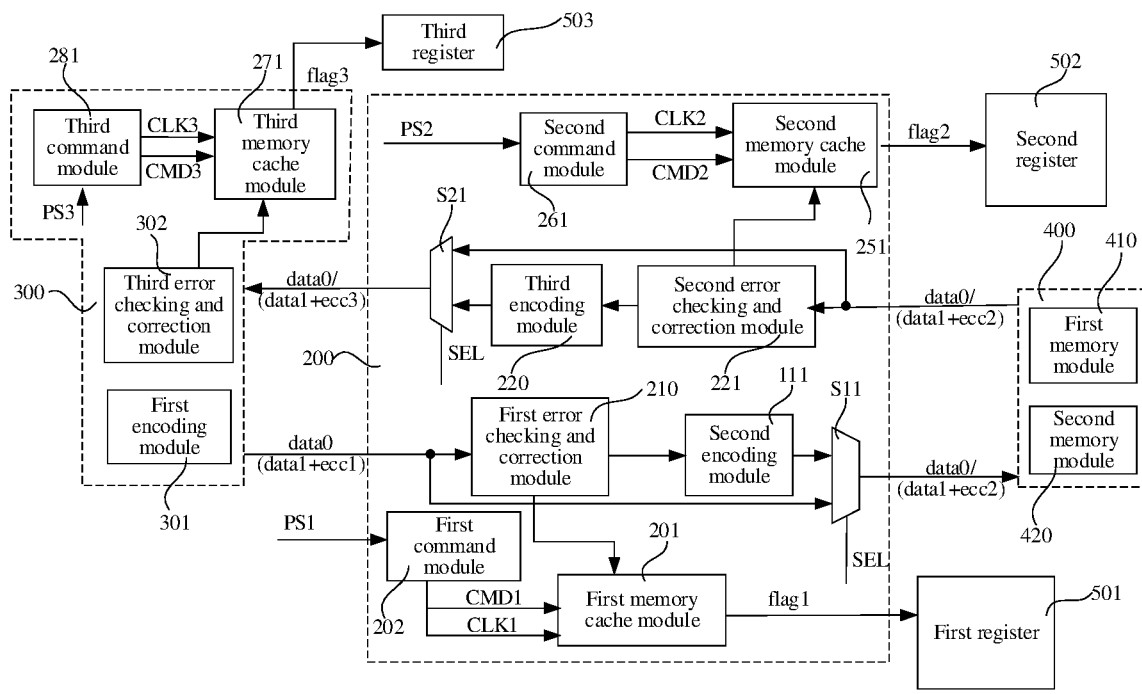
FIG. 10 is a fourth schematic structural diagram of a memory system according to an embodiment of the present application.

Referring to FIG. 10, FIG. 10 is a schematic structural diagram based on FIG. 8. In some embodiments, the base die 200 may be further configured to generate a first error checking marker signal during the first error checking and correction processing, and record, based on the first error checking marker signal, an error of the first data data1 and an error of the first encoded data ecc1 during transmission. The memory system may further include: a first register 501, configured to store the error of the first data data1 and the error of the first encoded data ecc1 during transmission.

Specifically, referring to FIG. 10, the base die 200 may include: a first memory cache module 201, configured to store the error of the first data data1 and the error of the first encoded data ecc1 during transmission; and a first command module 202, configured to receive a first polling instruction PS1, and generate a first command signal CMD1 and a first clock signal CLK1. The first memory cache module 201 is further configured to output a first representation signal flag1 to the first register 500 based on the first command signal CMD1 and the first clock signal CLK1, where the first representation signal flag1 represents the error of the first data data1 or the error of the first encoded data ecc1 during transmission.

In some embodiments, the processor 300 may further be configured to send the first polling instruction PS1 to the first command module 202, that is, the processor 300 performs polling regularly, to control the first memory cache module 201 to output the first representation signal flag1 to the first register 501. It may be understood that, in other embodiments, the first polling instruction may alternatively be provided by an external circuit.

Referring to FIG. 10, in some embodiments, the base die 200 may further be configured to: generate a second error checking marker signal during the second error checking and correction processing, and record, based on the second error checking marker signal, an error of the first data data1 on which the first error checking and correction processing has been performed and an error of the second encoded data ecc2 during transmission. The memory system may further include: a second register 502, configured to store the error of the first data data1 on which the first error checking and correction processing has been performed and the error of the second encoded data ecc2 during transmission.

Referring to FIG. 10, in some embodiments, the base die 200 may further include: a second memory cache module 251, configured to store the error of the first data data1 on which the first error checking and correction processing has been performed and the error of the second encoded data ecc2 during transmission; and a second command module 261, configured to receive a second polling instruction PS2, and generate a second command signal CMD2 and a second clock signal CLK2. The second memory cache module 251 is further configured to output a second representation signal flag2 to the second register 502 based on the second command signal CMD2 and the second clock signal CLK2, where the second representation signal flag2 represents the error of the first data data1 on which the first error checking and correction processing has been performed and the error of the second encoded data ecc2 during transmission.

Referring to FIG. 10, in some embodiments, the processor 300 may be further configured to: generate a third error checking and correction signal during the third error checking and correction processing, and record, based on the third error checking and correction signal, an error of the first data data1 on which the second error checking and correction processing has been performed during transmission. The memory system may further include: a third register 503, configured to store the error of the first data data1 on which the second error checking and correction processing has been performed during transmission.

Referring to FIG. 10, in some embodiments, the processor 300 may further include: a third memory cache module 271, configured to store the error of the first data on which the second error checking and correction processing has been performed during transmission; and a third command module 281, configured to receive a third polling instruction PS3, and generate a third command signal CMD3 and a third clock signal CLK3. The third memory cache module 271 is further configured to output a third representation signal flag3 to the third register 503 based on the third command signal CMD3 and the third clock signal CLK3, where the third representation signal flag3 represents the error of the first data data1 on which the second error checking and correction processing has been performed during transmission.

It may be understood that, the first register 501, the second register 502, and the third register 503 may be the same register.

In the memory system provided by the foregoing embodiment, the base die 200 can implement the error checking and correction function. Accordingly, the memory die 400 does not need to have the error checking and correction function, and the base die 200 can assist in the error checking and correction function originally taken by the processor 300. Therefore, this helps save the space and areas of the processor 300 and the memory die 400, thereby improving the storage performance of the memory die 400 and enhancing the storage performance of the memory system. Moreover, the base die 200 may further choose, based on the selection signal SEL, whether to participate in the ECC error checking and correction, so that the read and write performance of the memory system meets different requirements. Specifically, if the base die 200 does not participate in the ECC error checking and correction, the memory system has a high data transmission rate; if the base die 200 participates in the ECC error checking and correction, the memory system has high data error checking and correction accuracy.

In addition, the first error checking and correction module 210, the second error checking and correction module 221, and the third error checking and correction module 302 can detect and correct errors on different data transmission paths, which improves the error checking and correction capability of the memory system and helps locate a specific data transmission path where an error occurs.

Accordingly, an embodiment of the present application further provides a semiconductor structure. The semiconductor structure may include the memory system provided by the foregoing embodiment. The semiconductor structure provided by the embodiment of the present application is described in detail below with reference to the drawings. It should be noted that, for the parts the same as or corresponding to those mentioned in the foregoing embodiment, reference may be made to the foregoing embodiment, and details will not be described herein again.

Figure 11:
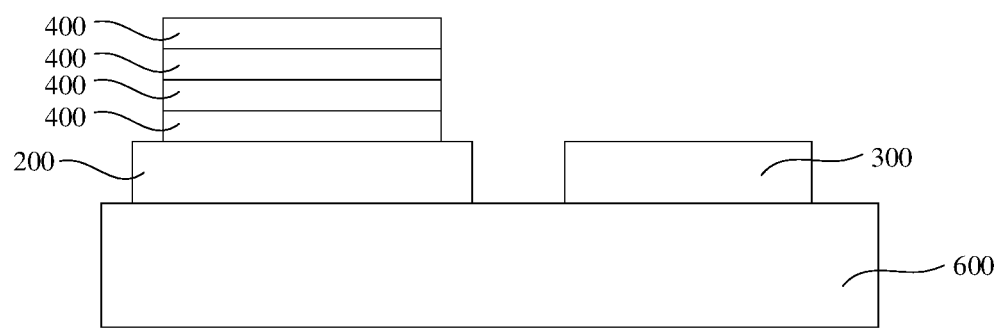
FIG. 11 is a cross-sectional schematic structural diagram of a semiconductor structure according to an embodiment of the present application.

FIG. 11 is a cross-sectional schematic structural diagram of a semiconductor structure according to an embodiment of the present application.

Referring to FIG. 11, the semiconductor structure includes: a carrier substrate 600; the memory system provided by the foregoing embodiment, where the processor 300 and the base die 200 are both located on a surface of the carrier substrate 600, and the memory die 400 is located on a surface of the base die 200 that is away from the carrier substrate 600.

The semiconductor structure may include a plurality of memory dies 400 stacked in sequence. The semiconductor structure may be a DRAM device, a SRAM device, or other memory.

In some embodiments, the carrier substrate 600 may be a printed circuit board (PCB). For the detailed description of the memory system, reference may be made to the foregoing embodiment, and details are not described herein again.

The semiconductor structure may be a 2.5-dimensional (2.5D) device. That is, the semiconductor structure is a stack structure, which helps reduce the size in a horizontal direction. In addition, the base die 200 in the semiconductor structure is used to implement the ECC error checking and correction function, thereby improving the performance of the semiconductor structure.

Those of ordinary skill in the art should understand that the above implementations are specific embodiments for implementing the present application. In practical applications, various changes may be made to the above implementations in terms of form and details without departing from the spirit and scope of the present application. Those skilled in the art may make changes and modifications to the implementations without departing from the spirit and scope of the present application. Therefore, the protection scope of the present application should be subject to the scope defined by the claims.

What is claimed is:

1. A base die, applied to a memory system, wherein
the base die is configured to: receive a first data and a first encoded data in a writing phase and perform a first error checking and correction processing, wherein the first encoded data is obtained by performing a first error correction code encoding processing on the first data; perform a second error correction code encoding processing on the first data on which the first error checking and correction processing has been performed, to generate a second encoded data; choose to transmit a to-be-written data to a memory die based on a selection signal in the writing phase, wherein the to-be-written data is either an initial data or a second data, the second data comprises the first data on which the first error checking and correction processing has been performed and the second encoded data, and the initial data comprises the first data and the first encoded data; and
the base die is further configured to: if the to-be-written data is the second data, receive the second data from the memory die in a reading phase, perform a second error checking and correction processing; perform a third error correction code encoding processing on the first data on which the second error checking and correction processing has been performed, to generate a third encoded data; choose to transmit a read data in the reading phase based on the selection signal, wherein the read data is either a third data or the initial data from the memory die, and the third data comprises the first data on which the second error checking and correction processing has been performed and the third encoded data.

2. The base die according to claim 1, comprising:
a first error checking and correction module, configured to receive the first data and the first encoded data in the writing phase, and perform the first error checking and correction processing;
a second encoding module, configured to receive, in the writing phase, the first data on which the first error checking and correction processing has been performed, and perform the second error correction code encoding processing to generate the second encoded data;
a second error checking and correction module, configured to receive the second data in the reading phase and perform the second error checking and correction processing;
a third encoding module, configured to receive, in the reading phase, the first data on which the second error checking and correction processing has been performed, and perform the third error correction code encoding processing to generate the third encoded data;
a first selection module, configured to choose to transmit either the initial data or the second data to the memory die based on the selection signal; and
a second selection module, configured to output a read data based on the selection signal, wherein the read data is either the third data or the initial data from the memory die.

3. The base die according to claim 2, further comprising:
a first deserializer module, configured to receive the first data and the first encoded data in the writing phase, perform a first deserialization processing on the first data and on the first encoded data, and transmit the first data on which the first deserialization processing has been performed and the first encoded data on which the first deserialization processing has been performed, to the first error checking and correction module and the first selection module; and
a first serializer module, configured to receive the read data from the second selection module in the reading phase, perform a first serialization processing on the read data, and transmit the read data on which the first serialization processing has been performed to a processor.

4. The base die according to claim 3, further comprising:
a second serializer module, configured to receive the to-be-written data from the first selection module in the writing phase, perform a second serialization processing, and transmit the to-be-written data on which the second serialization processing has been performed to the memory die; and
a second deserializer module, configured to receive the second data or the initial data from the memory die in the reading phase, and perform a second deserialization processing.

5. The base die according to claim 1, wherein the base die is further configured to generate a first error checking marker signal during the first error checking and correction processing, and record, based on the first error checking marker signal, an error of the first data and an error of the first encoded data during transmission.

6. The base die according to claim 5, further comprising:
a first memory cache module, configured to store the error of the first data and the error of the first encoded data during transmission; and
a first command module, configured to receive a first polling instruction, and generate a first command signal and a first clock signal;
wherein the first memory cache module is further configured to output a first representation signal based on the first command signal and the first clock signal, the first representation signal represents the error of the first data or the error of the first encoded data during transmission.

7. The base die according to claim 1, wherein the base die is further configured to: generate a second error checking marker signal during the second error checking and correction processing, and record, based on the second error checking marker signal, an error of the first data on which the first error checking and correction processing has been performed and an error of the second encoded data during transmission.

8. The base die according to claim 7, further comprising:
a second memory cache module, configured to store the error of the first data on which the first error checking and correction processing has been performed and the error of the second encoded data during transmission; and
a second command module, configured to receive a second polling instruction, and generate a second command signal and a second clock signal;
wherein the second memory cache module is further configured to output a second representation signal based on the second command signal and the second clock signal, the second representation signal represents the error of the first data on which the first error checking and correction processing has been performed and the error of the second encoded data during transmission.

9. A memory system, comprising a processor, a base die, and a memory die, wherein:
the processor is configured to: perform a first error correction code encoding processing on a first data in a writing phase to generate a first encoded data, and transmit the first data and the first encoded data to the base die;
the base die is configured to: receive the first data and the first encoded data in the writing phase, perform a first error checking and correction processing, perform a second error correction code encoding processing on the first data on which the first error checking and correction processing has been performed to generate a second encoded data, and choose to transmit a to-be-written data to the memory die in the writing phase based on a selection signal, wherein the to-be-written data is either an initial data or a second data, the second data comprises the first data on which the first error checking and correction processing has been performed and the second encoded data, and the initial data comprises the first data and the first encoded data;
the base die is further configured to: if the to-be-written data is the second data, receive the second data from the memory die in a reading phase, perform a second error checking and correction processing, perform a third error correction code encoding processing on the first data on which the second error checking and correction processing has been performed to generate a third encoded data, and choose to transmit a read data to the processor in the reading phase based on the selection signal, wherein the read data is either a third data or the initial data from the memory die, and the third data comprises the first data on which the second error checking and correction processing has been performed and the third encoded data;
the memory die is configured to receive the to-be-written data in the writing phase, store the to-be-written data, and transmit the read data to the base die in the reading phase; and
the processor is further configured to receive the read data in the reading phase, perform a third error checking and correction processing on the read data, and obtain the first data on which the third error checking and correction processing has been performed.

10. The memory system according to claim 9, wherein the processor comprises:
a first encoding module, configured to perform the first error correction code encoding processing on the first data in the writing phase to generate the first encoded data; and
a third error checking and correction module, configured to receive the read data in the reading phase and perform the third error checking and correction processing.

11. The memory system according to claim 9, wherein the base die comprises:
a first error checking and correction module, configured to receive the first data and the first encoded data in the writing phase, and perform the first error checking and correction processing;
a second encoding module, configured to receive, in the writing phase, the first data on which the first error checking and correction processing has been performed, and perform the second error correction code encoding processing to generate the second encoded data;
a second error checking and correction module, configured to receive the second data in the reading phase and perform the second error checking and correction processing;
a third encoding module, configured to receive, in the reading phase, the first data on which the second error checking and correction processing has been performed, and perform the third error correction code encoding processing to generate the third encoded data;
a first selection module, configured to choose to transmit either the initial data or the second data to the memory die based on the selection signal; and
a second selection module, configured to output a read data based on the selection signal, wherein the read data is either the third data or the initial data from the memory die.

12. The memory system according to claim 11, wherein the base die further comprises:
a first deserializer module, configured to receive the first data and the first encoded data in the writing phase, perform a first deserialization processing on the first data and on the first encoded data, and transmit the first data on which the first deserialization processing has been performed and the first encoded data on which the first deserialization processing has been performed to the first error checking and correction module and the first selection module; and
a first serializer module, configured to receive the read data from the second selection module in the reading phase, perform a first serialization processing on the read data, and transmit the read data on which the first serialization processing has been performed to the processor.

13. The memory system according to claim 12, wherein the base die further comprises:
a second serializer module, configured to receive the to-be-written data from the first selection module in the writing phase, perform a second serialization processing, and transmit the to-be-written data on which the second serialization processing has been performed to the memory die; and
a second deserializer module, configured to receive the second data or the initial data from the memory die in the reading phase, and perform a second deserialization processing.

14. The memory system according to claim 9, wherein the first error correction code encoding processing, the first error checking and correction processing, the third error correction code encoding processing, and the third error checking and correction processing are implemented by a first compiling algorithm; the second error correction code encoding processing and the second error checking and correction processing are implemented by a second compiling algorithm; and the first compiling algorithm is different from the second compiling algorithm.

15. The memory system according to claim 9, wherein the base die is further configured to generate a first error checking marker signal during the first error checking and correction processing, and record, based on the first error checking marker signal, an error of the first data and an error of the first encoded data during transmission; and the memory system further comprises:
   a first register, configured to store the error of the first data and the error of the first encoded data during transmission.

16. The memory system according to claim 9, wherein the base die is further configured to generate a second error checking marker signal during the second error checking and correction processing, and record, based on the second error checking marker signal, an error of the first data on which the first error checking and correction processing has been performed and an error of the second encoded data during transmission; and the memory system further comprises:
   a second register, configured to store the error of the first data on which the first error checking and correction processing has been performed and the error of the second encoded data during transmission.

17. The memory system according to claim 9, wherein the processor is further configured to generate a third error checking marker signal during the third error checking and correction processing, and record, based on the third error checking marker signal, an error of the first data on which the second error checking and correction processing has been performed during transmission; and the memory system further comprises:
   a third register, configured to store the error of the first data on which the second error checking and correction processing has been performed during transmission.

18. The memory system according to claim 9, wherein the memory die comprises:
   a first memory module, configured to store the first data or the first data on which the first error checking and correction processing has been performed; and
   a second memory module, configured to store the first encoded data or the second encoded data.

19. A semiconductor structure, comprising:
a carrier substrate; and
the memory system according to claim 9, wherein the processor and the base die are both located on a surface of the carrier substrate, and the memory die is located on a surface of the base die that is away from the carrier substrate.

* * * * *